United States Patent [19]

Bernstein et al.

[11] 4,034,483
[45] July 12, 1977

[54] SONAR BEAMFORMING APPARATUS SIMULATION

[75] Inventors: Frank Hutzler Bernstein, Baltimore; Robert Richard Fontaine, Riverdale, both of Md.

[73] Assignee: The Singer Company, Binghamton, N.Y.

[21] Appl. No.: 650,724

[22] Filed: Jan. 20, 1976

[51] Int. Cl.² .......................................... G09B 9/00
[52] U.S. Cl. ................................................. 35/10.4
[58] Field of Search ...................................... 35/10.4

[56] References Cited

U.S. PATENT DOCUMENTS

| | | | |
|---|---|---|---|
| 2,713,729 | 7/1955 | Springer | 35/10.4 |
| 2,991,562 | 7/1961 | Hare | 35/10.4 |
| 3,363,045 | 1/1968 | Pommerening | 35/10.4 |
| 3,479,439 | 11/1969 | Kaufman et al. | 35/10.4 |
| 3,916,533 | 11/1975 | Kijesky | 35/10.4 |

*Primary Examiner*—T.H. Tubbesing
*Attorney, Agent, or Firm*—Ronald Reichman; James C. Kesterson

[57] ABSTRACT

This disclosure describes apparatus for generating electrical signals which simulate the signals actually used by most sonar systems to indicate direction from which the sounds are received. In many passive sonar systems, arrays of hydrophones receive underwater signals from a number of sources. To indicate the direction of the sources from the receivers, the signals are manipulated so that they form, in effect, an axis along which the source of maximum amplitude lies. The equipment for performing this operation is contained in most sonar systems, and the simulation of such equipment is an expensive one. Therefore, this apparatus operates under the control of a simulation computer to generate signals which have the direction charactertistics of signals received by hydrophone arrays and which have been formed into two theoretical beams, one on each side of the axis of maximum amplitude. The apparatus of this invention includes beamformers for each of the sound sources to be simulated, all under the control of the computer.

9 Claims, 4 Drawing Figures

SONAR BEAMFORMING APPARATUS SIMULATION

BACKGROUND OF THE INVENTION

1. Field of the Invention

This invention relates to simulation apparatus and, more particularly, to apparatus for simulating signals suitable for simulating operational sonar equipment. In most undersea work, the ships, submersibles, etc., contain sonar equipment which enable the operators to listen in on the environment. Under water, listening is almost as important as seeing is above water. The listening equipment can produce signals which indicate the direction from which distant sounds are coming and can distinguish between coherent sound sources and the random noise of the sea. The operation of such sonar equipment can be quite complex and, for best performance of the system, the operator should be carefully a completely trained. To train such operators, simulators are often used. The simulators duplicate the generation of the actual sounds under the control of an instructor without requiring that actual sound sources be present. In this manner, the equipment can duplicate a number of sound sources to train the operators in recognizing the various sources and can vary the direction from the trainee of the different sources so that the trainee is taught to use his equipment.

2. The Prior Art

In general sonar simulators of the prior art were analog systems for the most part. It was only recently that digital systems for the simulation of sonar systems became generally utilized. Analog systems are not readily controlled by digital computers, and such computers are the core of most modern simulators. In addition, past sonar simulators have simulated a large portion, if not all, of the operation sonar system. This produced systems which are large and expensive.

SUMMARY OF THE INVENTION

This invention comprises a system for generating electrical signals under the control of a digital computer and an instructor, which signals may be used to drive a passive operational sonar system.

It is an object of this invention to provide a new and improved simulator.

It is another object of this invention to provide a new and improved system for simulating sonar systems.

It is a further object of this invention to provide a new and improved electronic system for generating specialized electrical signals.

It is still another object of this invention to provide a new and improved system for simulating at least a portion of a sonar system.

Other objects and advantages of this invention will become more apparent as the following description proceeds, which description should be considered together with the accompanying drawings.

DESCRIPTION OF A PREFERRED EMBODIMENT

Figure 1:
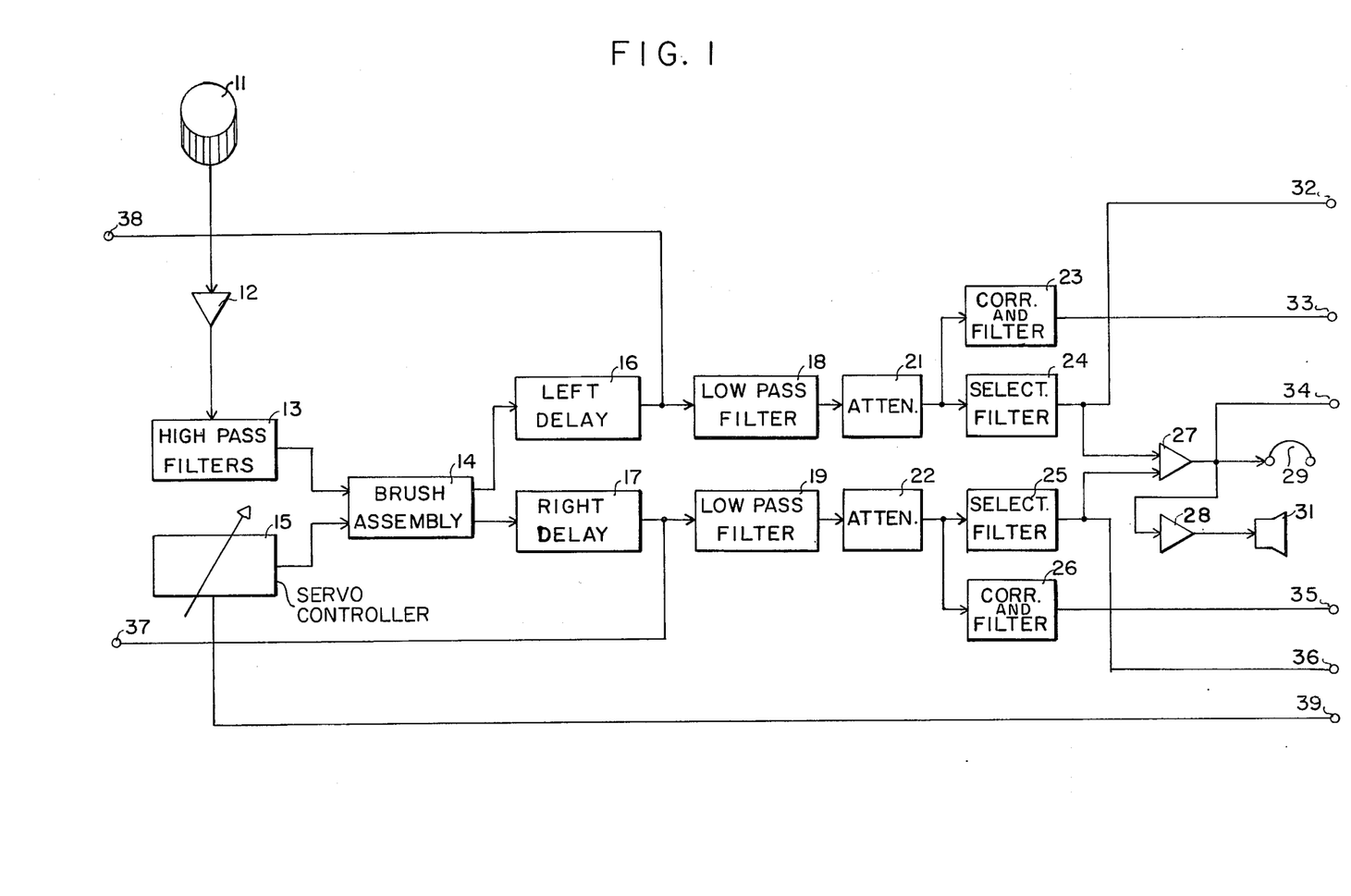
FIGS. 1 and 2 comprise a single block diagram of a typical passive sonar system.

Referring now to the drawings in detail and, more particularly, to FIG. 1, the reference character 11 designates a cylindrical array of hydrophones which are coupled by means of a suitable cable to a group of amplifiers 12. Often the amplifiers 12 are placed very close to the array 11 to reduce the length of cable connecting the two. The outputs of the amplifiers 12 are applied to the inputs of high pass filters 13 whose outputs are applied as separate inputs to a collector-brush assembly 14. The two sets of outputs from the brush assembly 14 are applied as separate inputs to a left beam delay network 16 and to a right beam delay network 17. Here the signals are beamformed into a left and a right channel. The left channel includes a low pass filter 18 which receives the output from the left beamformer 16, an attenuator 21 which receives the output from the filter 18, a selectable filter 24 and a correlator and filter 23, both of which receive the output from the attenuator 21. The outputs from the correlator and filter 23 and the filter 24 are applied to terminals 33 and 32 respectively for application to that part of the system shown in FIG. 2. But, the output of the filter 24 is also applied as one input to a sum/difference amplifier 27 whose output feeds a terminal 34, a head set 29 and the input to a loudspeaker amplifier 28. The output of the amplifier 28 is applied to a speaker 31.

The right channel comprises a low pass filter 19 whose input is connected to the output of the beamformer 17, an attenuator 22 whose input is connected to the output of the filter 19, and a selectable filter 25 and a correlator and filter 26 whose inputs are connected to the output of the attenuator 22. The output of the filter 25 is applied to both the output terminal 36 to the system of FIG. 2 and to the other input of the sum/difference amplifier 27. The output of the correlator and filter 26 is applied to the terminal 35 for application to FIG. 2. In addition, input terminal 38 is connected to the input of the low pass filter 18 in the left channel and the input terminal 37 is connected to the input of the low pass filter 19 in the right channel. Both the terminals 37 and 38 are connected to the outputs of the apparatus shown in FIG. 3. It is at these points that the synthesized signals generated by this system are applied to the sonar equipment. An output terminal 39 is also connected to the output of the servo control 15.

The array 11 comprises a large number of rectangularly shaped hydrophones arranged as the staves of a barrel to form a cylinder 11. Each of the hydrophones comprises a piezoelectric element which has the rectangular shape plus the wiring required to derive the electrical energy therefrom. Most hydrophones are piezoelectric devices although they are not restricted to that. It is clear that electromagnetic and similar devices could also be used. Generally, the array 11 is arranged with the longitudinal axis of the array vertical in the water. This is the normal orientation when the array is used for ship location. Should the array 11 be used for geological survey work, the longitudinal axis would undoubtedly be at an angle to the vertical. In any case, it is assumed that the source of the sound which strikes the array 11 is sufficiently far away that the wave or sound front is flat at the array. When the sound front reaches the array 11, it first strikes the hydrophones closest to the source and then takes a finite time to pass by each of the hydrophones in succession. A separate line is provided for each of the hydrophones in the array 11, and all of the lines are bound together into a cable, suitably shielded, which connects the hydrophones to individual preamplifiers 12. Thus, if there are, for example, 100 hydrophones in the array 11, then there are also 100 amplifiers 12, and 100 high pass filters 13. Similarly, there will be 100 contacts in the collector and brush assembly 14.

The brush assembly comprises a plurality of brushes arranged on a rotatable shaft to contact the contacts. In the simplest case where the array 11 comprises a relatively small number of separate hydrophones, the brush assembly would consist of one brush for each contact. However, this is not necessary and the number of brushes used depends upon many things such as the possible shadowing of a portion of the array 11 by the structure upon which the array 11 is mounted, the resolution desired, the frequency response of the entire system, and so forth. In any case, each brush is connected to a separate delay line input tap in the delay networks 16 and 17. The delay networks are arranged so that the delay imposed upon the signals from the individual hydrophones would decrease with the time required for the sound to travel from one hydrophone to the next. The combination of the brush assembly picking signal from the individual hydrophones off the separate contacts and the delay networks serves to combine the individual hydrophone signals from each side of the array 11 into a left beam and a right beam. The axis of maximum reception for any signal source would lie midway between the right and the left beams. As the operator controls his servo controller 15, the brush shaft in the assembly 14 is caused to rotate, and this rotates the direction of the right and the left beams. The outputs of the delay netwroks 16 and 17 are applied to the low pass filters 18 and 19 and to the step attenuators 21 and 22, which are included to limit the power so that the equipment is not overloaded by too much gain in the amplifiers.

The information received by the hydrophones is used in three different ways. The output of the filter 24 and filter 25 are applied through the sum/difference amplifier 27 to the headset 29 and through the amplifier 28 to the speaker 31 to provide aural information to the operator. From this information, the operator can determine the general direction of the source by the changes in volume of the sound he hears as the brushes are rotated in the assembly 14. The filters 24 and 25 are provided to permit the operator to change the frequency response so as to select the best frequency band for any particular situation. In addition, the phase difference differences between the signals in the right and the left beams are measured as an indication of the location of the maximum response axis and, therefore, the direction of the source, and the processed phase information is displayed, on both a cathode ray tube oscilloscope and a bearing time recorder, so that the bearings of the received signals can be determined. All of this information combined provides a substantial knowledge about the direction and the characteristics of the source so that it is readily identified by a trained operator. The outputs applied to the output terminals 32, 33, 34, 35 and 36 are used in the remainder of the apparatus for such purposes.

Figure 2:
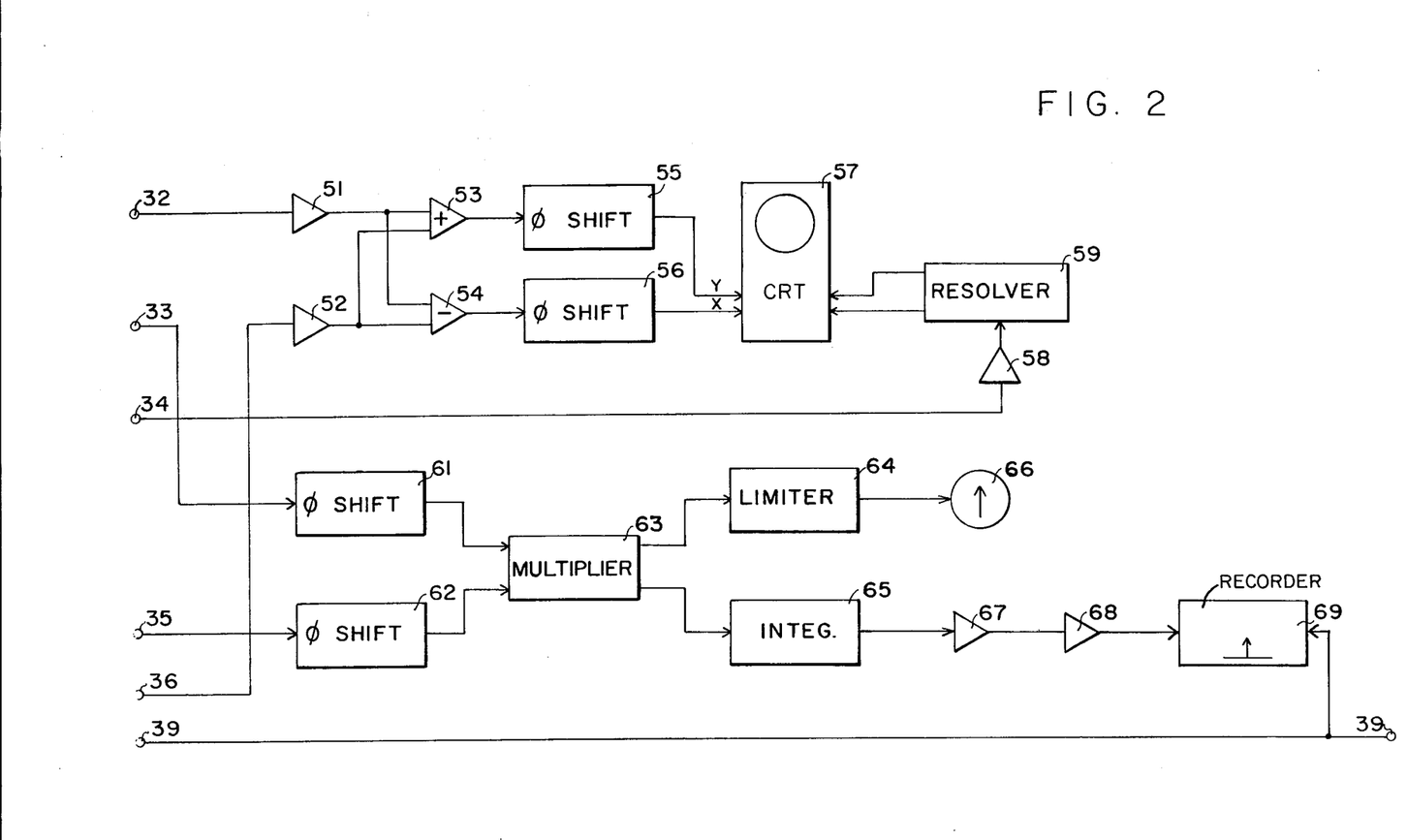

In FIG. 2 the input terminal 32 is connected to the input of an amplifier 51 whose output is connected to both the input to an amplifier 53 and an amplifier 54. The input terminal 34 is connected to the input of resolver amplifier 58. The input terminal 33 is connected to the input of a phase shifter and limiter 61 whose output is connected to one input of a phase multiplier 63. The input terminal 35 is connected to the input of a second phase shifter and limiter 62 whose output supplies the second input to the multiplier 63. Input terminal 36 is connected to the input of an amplifier 52 whose output is connected to the inputs of amplifiers 54 and 53. The amplifiers 53 and 54 are differential or summing amplifiers whose outputs are the algebraic sums and differences respectively of their inputs. The output of the amplifier 53 is applied to the input of a phase shift circuit 55, and the output of the amplifier 54 is applied to the input of a phase shift circuit 56. The output of the phase shift circuit 55 supplies the Y deflection to one input of a cathode ray tube oscilloscope 57, and the output of the phase shift circuit 56 supplies the X deflection to one input to the oscilloscope 57. The information applied to the two input terminals 33 and 35 are applied through the phase shifters and hard limiters 61 and 62 and the limited and phase shifted signals are applied to the two inputs of the phase multiplier 63. The output of the multiplier 63 is applied to a limiter 64 and to an integrator 65. The output of the limiter 64 is applied to any suitable indicating instrument 66, and the output from the integrator 65 is applied through a chopper and regulating amplifier 67 and a recorder amplifier 68 to the input of a pen in recording instrument 69 in which the pen stylus position is driven by the servo control output terminal 39.

The outputs from the left and right channels are applied to corresponding output terminals in FIG. 1. The output of the two correlators and filters are terminals 33 and 35, and the output from the two filters 24 and 25 are terminals 32 and 36. The corresponding signals from the left and right channels are applied to the same portions of the system shown in FIG. 2. Thus, the information coming in to FIG. 2 on terminals 32 and 36 is applied through the amplifiers 51 and 52 to the two inputs of each of the differential amplifiers 53 and 54 where they are summed and subtracted respectively. The outputs of the individual amplifiers 53 and 54 are phase shifted by the shifters 55 and 56 to determine the relative positions or separation between the left and the right beams. These are displayed on the oscilloscope 57 in the form of an outward deflecting circle. Superimposed upon this display is the output of the resolver 59 which receives the audio signals from resolver amplifier 58 and the input to amplifier 58 comes from amplifier 27 which is also applied to the headset 29. The resolver 59 applies the audio information to the display at the azimuth that the audio is received, so that the circle which is being displayed is distorted in the direction of the source of noise.

Similarly, the information received on the terminals 33 and 35 is applied to the inputs of the phase shifters 61 and 62 where they are shifted 90 degrees with respect to each other. The output signals from the phase shifters 61 and 62 are then applied to the phase multiplier 63 which acts as a phase detector to determine the difference in the phases of the two signals. The output of the multiplier 63 is applied on one hand to a limiter for application to the instrument 66, and on the other hand to an integrator 65 where it is integrated, and then chopped by the chopper amplifier 67 and amplified by the recorder amplifier 68 for application to a time recorder 69. In this manner, the sound, which is received by the array 11 is manipulated to enhance the signal-to-noise ratio, is formed into two reception beams or lobes to define the axis of maximum response which indicates the direction from which the sound is coming, is listened to on a headset and a speaker, is used to drive the needle of a meter, is displayed on a CRT oscilloscope with the direction from the sound source indicated, and is used to drive a recorder to make permanent record of the sound, its direction and its frequency content.

Figure 3:
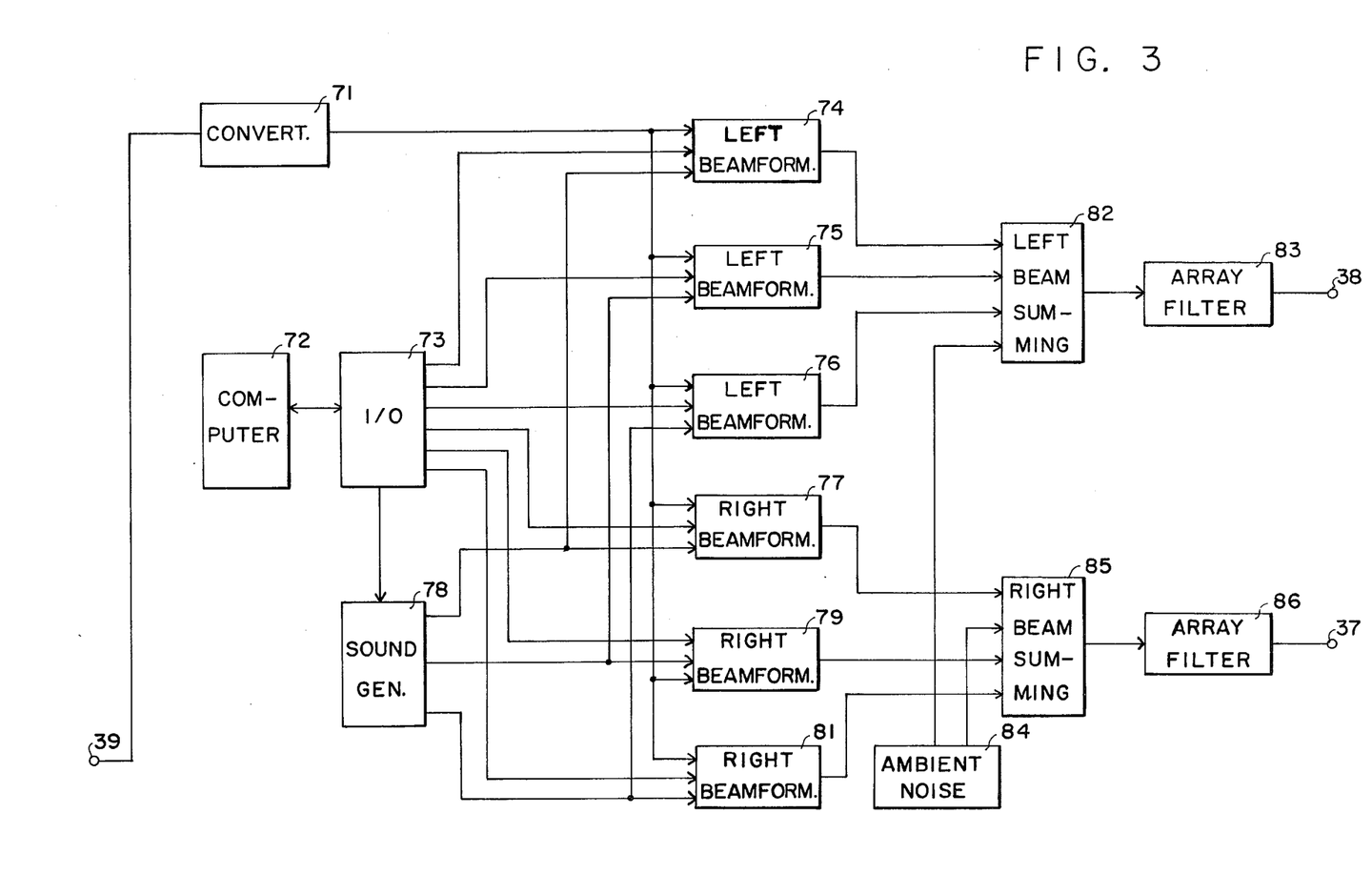
FIG. 3 comprises a block diagram of a signal generator according to this invention.

FIG. 3 shows one form that the overall generator of this invention can take. As mentioned above, this invention is described as a portion of a simulation system in which it is desired to simulate the sound sources normally associated with sonar systems. FIGS. 1 and 2 have illustrated a typical sonar system, and the apparatus shown in FIG. 3 is one system which can be used to generate signals representative of typical underwater targets and to form them into the desired beams so that the actual equipment shown in FIGS. 1 and 2 can be stimulated thereby. This provides a system which uses the equipment already available and permits the utilization of that equipment for training purposes by controlling the signals applied to that system. These signals in actual use would be uncontrollable and unpredictable so that the training value of using the operational equipment in normal use is questionable.

The simulation computer 72 has its output coupled through a standard input-output interface 73 to the inputs of a group of left and right beamformers 74, 75, 76, 77, 79 and 81. The beamformers are shown in greater detail in FIG. 4. A source of sounds 78 may be any suitable source such as a sound generating computer system, or, more commonly, a recorder having the desired sounds recorded thereon. The separate outputs from the sound source 78 are each applied to an input of one of the beamformer left and right pairs 74–81. In addition to the other inputs to the beamformers 74–81, there is one additional input to all of them, and that input is an output from the servo control system 15 of FIG. 1. This output is applied to the beamformers by means of the terminals 39. The outputs of the individual left beamformers 74–76 are applied to the inputs of a left beam summing circuit 82. The output of the right beamformers 77–81 are applied to the inputs of a right beam summing circuit 85. Also applied to the inputs of the left and the right beam summing circuits 82 and 85 is the uncorrelated outputs of a dual ambient noise generator 84. The outputs from the summing circuits 82 and 85 are applied to their separate filters 83 and 86, and therefrom to output terminals 37 and 38.

The simulation computer 72 really only controls the beamforming circuits 74–81. The source of the sounds is the second source 78. As mentioned above, this may be any suitable sound source. Recently computer generated sounds have been successfully used in simulators using a Fast Fourier Transform computer to perform the inverse Fourier transform to create the desired sounds. The source 78 may be such a source or, as mentioned above, it may be a sound recorder having a plurality of sounds recorded thereon and having rapid selection means. The source 78 has several outputs so that several sounds can be supplied to the beamformers simultaneously, although it is quite feasible to use a single output and multiplex the signals. Although not shown in FIG. 3 but a part of such a system is an instructor station where an instructor may control the system so that the selected sounds are generated by the source 78, are applied to the particular beamformers 74–81 selected by the instructor at the directions from the simulated hydrophone array which are also selected by the instructor. For this discussion it can be assumed that the instructor controls the computer to perform these functions. The output from the computer 72 passes through the interface 73 which is any interface suitable for the computer and the purpose used and is applied to the individual beamformers 74–81 to control the application of the sounds to the beamformers at any time. In addition, the computer 72 applies control signals to the sound source 78 to control the selection of the sounds and the time of selection. Thus, the system is under the control of the computer which, in turn, is under the control of the instructor. The output of each of the beamformers comprises sound signals of a selected type and having a particular orientation. The outputs from all of the left beamformers 74–76 and one of the outputs of the ambient noise source 84 are combined into a single signal in the summing circuit 82, and the outputs from all of the right beamformers and one of the output of the ambient noise source 84 are combined in the right summing circuit 85. After passing through the filters 83 and 86 which limit the frequency range of the two beams, the final output applied to the terminals 38 and 37 are two beams containing the sounds at the orientation selected. Terminals 37 and 38 are applied to the inputs of the low pass filters 18 and 19 of FIG. 1 to substitute for the same signals which would ordinarily be applied to the filters 18 and 19 from the left and right beamformers 16 and 17.

Figure 4:
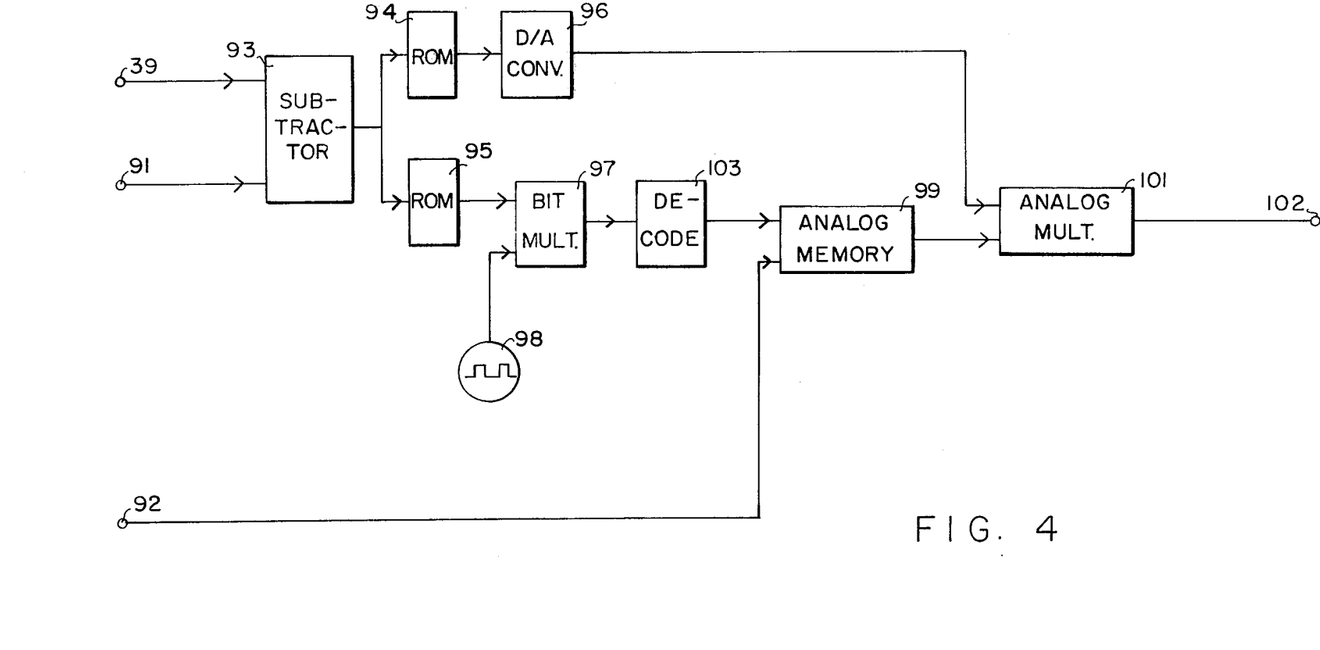
FIG. 4 is a block diagram of the beamformers of FIG. 3.

FIG. 4 is a block diagram of the individual beamformers 74–81 of FIG. 3. The output from the synchro-to-digital convertor whose output is connected to the terminal 39 applies its input to a digital differential or subtractor circuit 93, which has a second input 91 from the computer 72. The output from the subtractor 93 is applied to a read-only-memory 94 which contains the stored characteristics of the particular array 11 as a function of the angle deviation of the target from the maximum response axis of the system, and to a read-only-memory 95 which contains delay characteristics of sound coming from an angle to the main response axis as it passes from one lobe to the other. The output from the ROM 94 is applied to the input of a suitable digital-to-analog (D/A) converter 96 where the digital information is converted into an equivalent amplitude waveform.

The output from the ROM 95 is applied to one input of a bit multiplier 97 which receives a second input from a digital clock 98. The output of the multiplier 97 is applied to a decorder circuit 103 which feeds timing pulses into the clock input of an analog memory 99. The other input 92 to the memory 99 comes from the sound source 78 of FIG. 3. The outputs from the analog memory 99 and the D/A converter 96 are applied to the two inputs of an analog multiplier 101 which feeds its output to an output terminal 102. The terminal 102 is connected to one of the inputs of the right or left beam summing circuit 82 or 85.

As indicated above, the circuit shown in FIG. 4 is the system which forms the bemformers 74–81. The system of FIG. 4 comprises one of the many beamformers shown in FIG. 3 as blocks 74–81. It should be understood that there is provided a separate left beam and right beam beamformer for each of the targets whose sounds are to be used in the system. If, therefore, 100 different targets under the control of the computer 72 and the instructor are to be used individually or in concert in the system to simulate 100 different underwater sound souces, then there must be provided 100 left and right beamformers. Each of the beamformers can be constructed as shown in FIG. 4. As shown in FIG. 3, each beamformer has three separate inputs: an input from the computer 72, an input from the servo control 15, and an input from the sound source 78. In FIG. 4, the input terminal 39 supplies the input signal from the servo control 15. This input represents the bearing of the maximum response axis of the array system as determined by the brush assembly under the control of the opertor. The input from the computer 72 is applied to the input terminal 91 and comprises the bearing of the target whose sounds are applied to this particular beamformer. The two bearings mentioned above are from the same reference point; therefore, the difference between the two values is the actual difference in bearing between the two. When this value is applied to the ROM (read-only-memory) 94, it serves as an addres to read out a signal whose amplitude is that of the particular array system used of a signal which approaches the array from the angle indicated. In other words, the ROM 94 contains digital information representative of the amplitudes of unit signals which would be received by the array 11 along the left or the right lobe of a signal whose bearing deviates from the left or the right lobe bearing by the amount used to address the ROM. As the bearing signal applied to the terminal 39 approaches that applied to the terminal 91 from the computer 72, the difference value from the output of the subtractor 93 decreases, and the amplitude output from the ROM 94 increasees. The ROM 95 has information stored therein which represents the characteristics of the underwater sound as it moves from one lobe to the next. The amount of time that a sound wave is delayed as it travels from one lobe to the next is dependent upon the angle at which the sound wave approaches the array 11. The ROM 95 has stored therein digital words which are proportional to the difference output from the subtractor 93. These words are decoded and used to determine the amount of delay actually imposed upon the sound signal as described below. The clock 98 supplies clock pulses to one input of the rate multiplier 97, and the output of the ROM 95 is applied to the other input of the multiplier 97. The digital word from the ROM 95 modifies the rate of the clock pulses from the clock 98 to generate a new word which is applied to a decoder 103. The decoder 103 applies its output to the control input of the analog memory 99. The analog memory 99 comprises any suitable means for storing amplitude signals or voltages. In one form it comprises a plurality of capacitors. An analog signal or waveform is sampled and the samples are sequentially applied to the individual capacitors. The reading operation can take place at the same time that the writing operation takes place or it can be delayed, and occur at some selected time after writing. The output from the decoder 103 is applied to the reading control of the memory 99 and determines the time delay between the writing and the reading operations in the memory 99. This delay is the amount of time that the sound would require to pass from one lobe to the other in the array 11. Since the apparatus shown in FIG. 4 can be either a right or a left beamformer, the delay applied to the memory 99 depends not only upon the physical characteristics of the array 11, the manner in which the beams are formed in the opertional equipment by the brush assembly 14 and the delays 16 and 17, and the velocity of sound in the particular medium in which the apparatus is being used, but also the direction from which the sound is coming and which beam is being formed. The other input to the analog memory 99 is the sounds of the particular target from the terminal 92. Thus, the sound signal from the terminal 92 is sampled in the memory 99, the individual samples are stored in the capacitors or other storage medium, and the memory elements are read at a slightly later timer to be transmitted to the input of an analog multiplier 101. The other input to the multiplier 101 comes from th ROM 94 through the analog-digital converter 96. Thus, two analog signals are applied to the inputs of the multiplier 101 which performs a normal multiplication. The output from the multiplier 101 is applied to the terminal 102 as the beam formed for a particular sound, from a particular target in a particular location with respect to the array 11. When this signal is applied to the beam summing circuits 82 or 85 of FIG. 3, the resultant signals can be applied to the operational equipment and appear as the actual sound signals would in normal operation.

This specification has described a new and improved simulation system for using at least a portion of available operational equipment and generating the unique signals that normally are operative in such equipment so that such signals and, therefore, the entie system, can be under the control of an instructor through a simulation computer. It is realized that this description may indicate to others in the art additional ways in which the principles of this invention may be used without deviating from the spirit of the invention. It is, therefore, intended that this invention be limited only by the scope of the appended claims.

What is claimed is:

1. A system for generating electrical signals to be substituted for normally received signals in navigational equipment, said system comprising means for providing signals to said navigational equipment which are representative of the signals normally provided by a plurality of actual signal sources; means for modifying each of said signals so that each of said signals that represents a separate actual source will be provided with a separate said modifying means in order to form said signals into two beams similar to the lobes of directional transmitting apparatus, and means for combining the outputs of said modifying means for each type of signal to form a composite signal having the characteristic of a right beam and a left beam with a specified orientation of both of said left and right beams.

2. The system defined in claim 1 further including a control means, said control means determining which of the plurality of signals is applied from said signal source to said modifying means and the orientation of said beams for each of said signals.

3. The system defined in claim 2 further means for adding to said left and right beams, additional electrical potentials representative of generalized ambient conditions such as noise.

4. The system defined in claim 3 further including means for deriving from said navigational equipment information representative of the orientation of the actual navigational equipment with respect to a right and a left beam, and means for applying said information to said modifying means.

5. The system defined in claim 4 wherein said modifying means comprises a subtractor, means for applying to one input of said subtractor the information from said navigational equipment, and means for applying to another input of said subtractor the orientation of said beams from said control means.

6. The system defined in claim 5 further including a first memory device in which characteristics of said navigation system with regard to the response of said equipment to signal from different orientations are stored in relation to said orientations, and means for applying the output from said subtractor to said first memory as the address therefor.

7. The system defined in claim 6 further including a second memory device in which the characteristics of delay in the signals passing from one beam to another are stored with respect to the orientation of said signals, and means for applying to said second memory as addreses the output from said subtractor.

8. The system defined in claim 7 further including a third memory device having means for writing information into said third memory at a first time and for reading the information stored therein at a second time, and means connected to the output of said second memory device for converting the output therefrom into control signals and for applying said control signals to said third memory to control said first and second times and the delays between said times.

9. The system defined in claim 8 further including means for receiving the output from said third memory as one input and for receiving the output from said first memory as a second input and for producing the product of said two inputs, and means for applying said product to said navigational equipment as synthetic navigational signals under the control of said control means.

* * * * *

UNITED STATES PATENT AND TRADEMARK OFFICE
CERTIFICATE OF CORRECTION

PATENT NO. : 4,034,483
DATED : July 12, 1977
INVENTOR(S) : Frank H. Bernstein et al It is certified that error appears in the above-identified patent and that said Letters Patent are hereby corrected as shown below:

Col. 1, line 21, "a" should be --and--.

Col. 3, line 26, "signal" should be --signals--.

Col. 3, lines 51/52 "difference" (first occurrence) should be deleted.

Col. 6, line 63 "bemformers" should be --beamformers--.

Col. 7, line 14, "opertor" should be --operator--.

Col. 7, line 22, "addres" should be --address--.

Col. 8, line 29 "entie" should be --entire--.

Col. 8, line 59, after "further" insert --including--.

Col. 10, line 2, change "addreses" to --addresses--.

Signed and Sealed this

Fourteenth Day of February 1978

[SEAL]

*Attest:*

RUTH C. MASON
*Attesting Officer*

LUTRELLE F. PARKER
*Acting Commissioner of Patents and Trademarks*